United States Patent [19]  
Edahiro et al.

[11] Patent Number: 4,528,010  
[45] Date of Patent: Jul. 9, 1985

[54] PROCESS FOR PRODUCING OPTICAL GLASS PRODUCT

[75] Inventors: Takao Edahiro; Nobuo Inagaki, both of Ibaraki; Shiro Kurosaki, Kanagawa, all of Japan

[73] Assignees: Nippon Telegraph & Telephone Public Corporation; Sumitomo Electric Industries, both of Japan

[21] Appl. No.: 584,968

[22] Filed: Feb. 29, 1984

Related U.S. Application Data

[63] Continuation of Ser. No. 295,965, Aug. 25, 1981, abandoned.

[30] Foreign Application Priority Data

Aug. 25, 1980 [JP] Japan .................................. 55-117524

[51] Int. Cl.$^3$ ............................................. C03B 19/06  
[52] U.S. Cl. ........................ 65/18.1; 65/3.14; 65/3.15; 65/17; 65/31; 501/12  
[58] Field of Search ................. 65/17, 3.14, 3.1, 18.1, 65/30.13, 3.2, 3.15, 31, 3.12, 18.3, 30.12, 3.11; 264/43; 106/74, 75; 501/12; 156/663

[56] References Cited

U.S. PATENT DOCUMENTS

| | | | |
|---|---|---|---|
| 3,597,252 | 8/1971 | Schroder et al. | 501/12 |
| 3,678,144 | 7/1972 | Shoup | 106/74 X |
| 3,821,070 | 6/1974 | Mahsmann et al. | 264/63 X |
| 4,037,019 | 7/1977 | Steger | 106/74 X |
| 4,059,658 | 11/1977 | Shoup et al. | 264/43 |
| 4,061,486 | 12/1977 | Jahn | 65/30.13 X |
| 4,098,595 | 7/1978 | Lenz et al. | 65/18.1 X |
| 4,110,093 | 8/1978 | Macedo et al. | 65/3.15 |
| 4,178,163 | 12/1979 | Wustef et al. | 501/12 X |
| 4,188,198 | 2/1980 | Macedo et al. | 65/31 X |
| 4,302,231 | 11/1981 | Macedo et al. | 65/3.15 |
| 4,323,381 | 4/1982 | Matsuyama et al. | 501/12 X |
| 4,436,542 | 3/1984 | Kurosaki | 65/18.1 |

Primary Examiner—Kenneth M. Schor  
Attorney, Agent, or Firm—Sughrue, Mion, Zinn, Macpeak, and Seas

[57] ABSTRACT

A process for producing an optical glass product having a predetermined distribution of refractive index in the interior of the product is disclosed. The process comprises the steps of:

(a) preparing an aqueous silicate solution containing from about 0.1 to about 0.6 mol/liter of Si (as $SiO_2$) comprising silicic acid and at least one element selected from the group consisting of rubidium, thallium and cesium;

(b) mixing the silicate solution with an acidic aqueous solution, and letting the two solutions react with each other for a period of time sufficient for polymerization to produce a porous gelled product wherein the silica particles are agglomerated;

(c) leaching the gelled product with a liquid selected from the group consisting of water, a weakly acidic aqueous solution, an aqueous solution having an alkali metal salt dissolved therein and an aqueous solution of organic matter capable of dissolving $Rb_2O$, $Cs_2O$, or $Tl_2O$, unitl the center of the product starts to dissolve; and (d) drying the leached product in a predetermined atmosphere, and further heating the partially leached gelled product at a temperature sufficiently high to eliminate the particulate material but lower than the melting point of the silica.

8 Claims, 2 Drawing Figures

PROCESS FOR PRODUCING OPTICAL GLASS PRODUCT

This a continuation of application Ser. No. 295,965, filed Aug. 25, 1981, now abandoned.

FIELD OF THE INVENTION

This invention relates to a process for producing an optical glass product that can be used as a lens in cameras, precision optical devices, and optoelectronic apparatuses, and which provides a three-dimensional distribution of refractive index within the lens. More particularly, this invention relates to rod lens having a refractive index that varies in a radial direction.

BACKGROUND OF THE INVENTION

A graded rod lens having a refractive index that decrease parabolically from the center outward in a radial direction in becoming increasingly popular as an optical product for use in copiers, facsimile apparatus, and fiber optics. Such rod lens is made of either glass or plastic, and some such products have been used on a commercial scale (see *Nikkei Electronics*, Aug. 20, 1979, pp. 64–74). Among the commercial products, the Selfoc lens ("Selfoc" is a tradename of Japan Selfoc Co., Ltd.), produced from multicomponent glass by an ion exchange method, is well known.

The production of rod lens by the ion exchange method has an inherent limiting factor, viz., the velocity of diffusion of the modifier ion that changes the refractive index at temperatures that do not deform the glass. For example, because of the necessity of using a fast diffusing cation, only a monovalent ion such as Tl, Cs, Rb, K, Na or Li can be used as the modifier ion, and furthermore to reduce the uneven distribution of refractive index is not easy. A large difference in refractive index can only be achieved by using Tl, but Tl is so toxic that it is not easy to handle. Also, it takes an excessively long period of time to produce a rod lens more than 3 mm in diameter at temperatures necessary for ion exchange that do not deform or break the glass, so such lens cannot be manufactured on an industrial scale.

A new method that relies on an entirely different principle, referred to as "molecular stuffing", and which is free from the above defects, has more recently been developed. According to this method, a porous glass preform is prepared by phase separation, leaching, and washing; $CsNO_3$ is solidified within the fine pores in the glass preform to provide a certain concentration gradient of $CsNO_3$; and then the pores are collapsed so as to provide a glass rod doped with $Cs_2O$ whose concentration decreases parabolically from the center outward. Details of this molecular stuffing method are described, e.g., in Japanese Patent Applications (OPI) Nos. 28339/75 which corresponds to U.S. Pat. Nos. 3,938,974 and 4,313,748, 12607/76 which corresponds to U.S. Pat. Nos. 4,110,093, 4,110,096, 4,220,682, 4,236,930, 4,313,748 and 102324/78 which corresponds to U.S. Pat. Nos. 4,188,198, 4,183,620 and 4,299,608 (OPI as used herein refers to an unexamined published Japanese patent application). However, for the very reason that the porous glass preform is prepared by phase separation, leaching, and washing, the open micropores produced in the leaching step have a defective pore size distribution (i.e., an annual ring or eccentricity), and as a result the desired variation in the distribution of the $Cs_2O$ concentration (and therefore the desired distribution of refractive index) is not completely obtainable. Furthermore, the maximum porosity of the resulting porous glass preform is 50%, and a higher porosity can not be achieved industrially, so a glass rod prepared by "stuffing" using a concentrated aqueous solution of $CsNO_3$, solidifying the $CsNO_3$, unstuffing (leaching) the $CsNO_3$, resolidifying the $CsNO_3$ and collapsing the micropores has a difference between the minimum and maximum refractive index of about 3.0% at most. Therefore, a porous glass preform having open micropores of a uniform desired size distribution has been strongly desired.

Various types of method for manufacturing porous glass have been known. For example, porous glass can be produced by the so-called Vycor method, ("Vycol" is a trademark of Corning Glass Works), the zeolite method, the white carbon method, the colloidal silica method and the silica gel method. There are two variations of the silica gel process: in one variation, a mixture of an aqueous solution of sodium silicate with an acid is stirred vigorously at low temperatures to form a silica hydrosol, which is gelled, given a predetermined form, and leached; in the other variation, a mixture of a solution of silicate salt with an organic compound causing the Cannizzaro reaction is stirred under slight heating to cause a mild reaction until a gel is formed, and after the gel is given a predetermined shape, the gel is leached.

One object of this invention is to provide a process for producing a lens material, and particularly a rod lens material, having a desired distribution of refractive index, and particularly providing a desired large difference between the minimum and maximum refractive indexes, by using a porous glass preform having open micropores of a uniform size distribution.

Another object of this invention is to provide an inexpensive lens material of a desired size.

SUMMARY OF THE INVENTION

The present invention provides a process for producing an optical glass product having a predetermined distribution of refractive index in the interior of the product, the process comprising the steps of:

(a) preparing an aqueous silicate solution containing from about 0.1 to about 0.6 mol/liter of Si (as $SiO_2$) comprising silicic acid and at least one element selected from the group consisting of rubidium, thallium, and cesium;

(b) mixing the silicate solution with an acidic aqueous solution, and letting the two solutions react with each other for a period of time sufficient for polymerization to produce a porous gelled product wherein the silica particles are agglomerated;

(c) leaching the gelled product with a liquid selected from the group consisting of water, a weakly acidic aqueous solution, an aqueous solution having an alkali metal salt dissolved therein, and an aqueous solution of organic matter capable of dissolving $Rb_2O$, $Cs_2O$, or $Tl_2O$, until the center of the product starts to dissolve; and (d) drying the leached product in a predetermined atmosphere, and further heating the partially leached gelled product at a temperature sufficiently high to eliminate the particulate material but lower than the melting point of the silica.

The present invention also provides a process described above wherein the aqueous silicate solution prepared in the step (a) above contains a member selected from the group consisting of ammonium, lithium, sodium and potassium.

The present invention further provides a process described above wherein the acidic aqueous solution of the step (b) above contains a cation capable of being converted to an oxide.

Still further, the present invention provides a process described above wherein prior to drying according to the step (d) above, the product is soaked in an organic solvent such as ethanol or propanol.

DETAILED DESCRIPTION OF THE INVENTION

Figure 1:
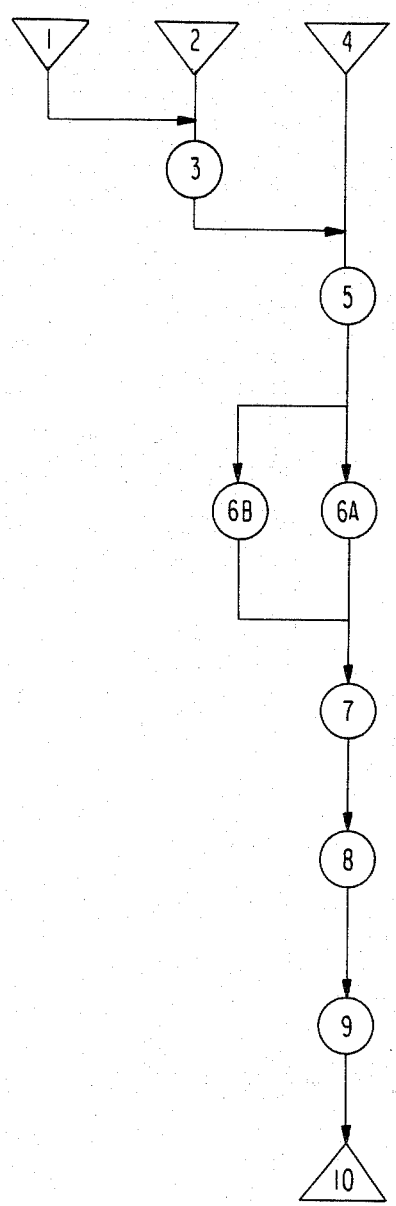
FIG. 1 is a flow sheet for the production of a $SiO_2$ glass preform containing $R_2O$ wherein R is Cs, Rb or Tl.

This invention has for the first time been accomplished by stopping the regular change due to diffusion (or ion exchange) of a compound that is converted to a dopant, and which compound is leachable in a leaching step of the silica gel process that does not use the Cannizzaro reaction. More specifically, we have found that by using $Tl_2O$, $Cs_2O$ $Rb_2O$ or the like as a dopant that provides great refractive index within the glass (that is, by using a starting solution of a silicate salt that also contains at least one of three solutions, viz., a thallium silicate solution, a cesium silicate solution, and a rubidium silicate solution), and by controlling the composition and temperature of the starting solution so as to distribute the dopant in such a manner that the velocity of diffusion (or ion exchange) and the solubility are controlled to provide a parabolic distribution of refractive index, a glass preform, e.g., a rod lens material, having the desired distribution of refractive index can be provided.

According to the process of this invention, a true solution, collodial dispersion, or a suspension that contains at least one salt selected from the group consisting of cesium silicate, rubidium silicate, and thallium silicate, and which optionally contains either quaternary ammonium silicate or collodial silica and any one of the three salts selected from among lithium polysilicate, sodium silicate and potassium silicate is prepared. The true solution, collodial dispersion, or suspension desirably contain from about 0.1 to about 0.6 mol/liter of Si, expressed as $SiO_2$.

To prepare the desired aqueous solution, an aqueous solution of sodium silicate containing, e.g., 6.8 wt% $Na_2O$—25 wt% $SiO_2$—balance $H_2O$; an aqueous solution of potassium silicate containing, e.g., 8.3 wt% $K_2O$—20.8 wt% $SiO_2$—balance $H_2O$; an aqueous solution of lithium polysilicate containing e.g., 2.1 wt% $Li_2O$—20 wt% $SiO_2$—balance $H_2O$; an aqueous solution of quaternary ammonium silicate containing, e.g., 9.9 wt% quaternary ammonium ion—45 wt% $SiO_2$—balance $H_2O$, an aqueous solution of colloidal silica containing, e.g., 40 wt% $SiO_2$—balance $H_2O$, an aqueous solution of rubidium silicate containing, e.g., 10.5 wt% $Rb_2O$—20 wt% $SiO_2$—balance $H_2O$; an aqueous solution of cesium silicate containing, e.g., 12 wt% $CsO_2$—20 wt% $SiO_2$—balance $H_2O$; and an aqueous solution of thallium silicate containing, e.g., 14 wt% $TlO_2$—20 wt% $SiO_2$—balance $H_2O$ may be diluted with water in order to provide the desired true solution, colloidal dispersion or suspension containing from about 0.1 to about 0.6 mol/liter of Si, expressed as $SiO_2$.

The aqueous solution of alkali silicate thus prepared is added to a dilute acid with stirring. Any acid can be used so long as it is acidic in nature in an aqueous solution, and examples of such acids are organic acids such as dilute acetic acid, inorganic acids such as dilute $H_2SO_4$ and an aqueous solution of $H_3BO_3$, $H_3PO_4$ or $Al_2(SO_4)_3$. Preferably, the first half of the aqueous alkali silicate solution is added slowly under vigorous stirring, and the second half is added in one portion. The resulting mixture has a pH of about 4.4. The mixture is then heated for a few minutes and left to stand until a gel results.

A gel of desired shape may be obtained by cutting or otherwise working the gel. Alternatively, the same purpose is achieved by pouring the aqueous alkali silicate into a vessel of a predetermined shape containing a dilute acid (with stirring), or by forming a mixture of the aqueous alkali silicate and a dilute acid under stirring and immediately pouring the mixture into a vessel of a predetermined shape. The mixture given a predetermined shape may be left to stand for, e.g., three days, to provide a completely gelled mixture. The gel may optionally be washed with aqueous $NH_4OH$ to neutralize the residual dilute acid.

The gel is then leached with water, an alcohol, ketone, an organic acid, an inorganic acid or a mixture thereof at a temperature in the range of from room temperature to the boiling point of the solvent. For instance, a solvent consiting of 1 to 5% $NHO_3$ and 95 to 99% $C_2H_5OH$, preferably 3 wt% $HNO_3$ and 97 wt% $C_2H_5OH$, or an aqueous 1M $NH_4NO_3$ solution can be used. As a result of leaching, the $Tl^+$, $Cs^+$ or $Rb^+$ ion dissolves out of the gel. The organic matter dissolves out more slowly. When the leaching is discontinued halfway, i.e., just after $Tl^+$, $Cs^+$ or $Rb^+$ of the central portion begins to be dissolved but before the total dissolution of $Tl^+$, $Cs^+$ or $Rb^+$ occurs, a gel wherein the concentration of $Tl^+$, $Cs^+$, or $Rb^+$ decreases from the center outward in the radial direction is obtained. It takes time to leach the gel with a hot aqueous solution of $NH_4OH$, but in any event, $Tl^+$, $Cs^+$, or $Rb^+$ is ion-exchanged with $NH_4^+$ to provide a product wherein the concentration of $Tl^+$, $Cs^+$ and $Rb^+$ is decreased from the center outward. Alternatively, an aqueous solution having $MX(M=[Li, Na, K], X=[NO_3, (SO_3)_{\frac{1}{2}}, (CO_3)_{\frac{1}{2}}$, etc.]) dissolved therein may be used in the leaching step, and the $Tl^+$, $Cs^+$, or $Rb^+$ ion may be dissolved out by ion exchange. In this alternative method, a dopant such as $Li_2O$, $Na_2O$ or $K_2O$ that does not greatly increase the refractive index is incorporated in such a manner that its concentration increases from the center outward.

The ion-exchanged gel is then slowly dried under vacuum, for example, by reducing the pressure from atmospheric pressure to about 1 mmHg over a period of more than about 24 hours. Alternatively, the gel is passed through a cold low-solubilizing solution, such as PrOH (0° C.), to stop the migration of $Tl^+$, $Cs^+$, or $Rb^+$, and is further dried. Then, the dried gel is gradually heated to remove the organic matter by oxidative combustion. Subsequently, the gel is dried by evaporating the water, alcohol, or other solvents in the micropores by means of creating a vacuum slowly as described above, or slowly reducing the partial pressure of water vapor in which it is placed. Furthermore, the dried gel is slowly heated in an oxygen atmosphere to evaporate or burn the organic compound, and then the gel is heated to a higher temperature (e.g., 900° to 1450° C.), at which the micropores collapse (due to high surface tension) to form a transparent glass product.

The distribution of the concentration of ions such as $Tl^+$, $Cs^+$, and $Rb^+$ being removed is determind by parameters of the surrounding conditions or diffusion constant in a diffusion equation such as the shape of the gel (e.g., spherical, cylindrical or oval shape), the porosity, the pore size, the surrounding liquid and temperature conditions.

A gel to be leached having a desired shape can be produced by pouring a stirred mixture of aqueous silicate salt and dilute acid into a vessel or a predetermined shape, e.g., a cylindrical plastic vessel, and then letting the mixture gel in that vessel. Alternatively, a gel of silica salt and dilute acid can be worked, for example, by drum grinding (or polishing) to provide a gel rod which is then leached. A gel of desired shape can also be produced by casting, drawing, pressing, rolling, and other conventional machining techniques.

The porosity and pore size vary with the type of alkali silicate, its proportion relative to the dilute acid the ratio of $SiO_2$ to water, and the ratio of $R_2O$ (wherein R=Tl, Cs, or Rb) to $SiO_2$. The aqueous solution of alkali metal silicate salt may also contain a silicate salt of Mg, Ca, Sr and Ba, in such an amount that they remain in solution and that the process conditions described above are met.

For providing the desired distribution of $Tl^+$, $Cs^+$ or $Rb^+$ in the leaching step, the surrounding liquid is preferably heated for a short period of time, but this is not a critical requirement. The aqueous silicate solution may further contain a dispersed substance such as, for example, $Al_2O_3$, $TiO_2$, $SiO_2$, $ZrO_2$ C, SiC, $Si_3N_4$, $U_2O_5$, $Cr_2O_3$, $Fe_2O_3$, CoO, NiO, MnO or CuO, or a salt, oxide or other forms of compounds of Nd and Sm. The particle size of the dispersed substance should not exceed 70$\mu$, and its content should not exceed 70 wt%. A glass preform obtained from a silicate solution containing a compound of Nd or Sm is suitable for use in a laser.

Figure 2:
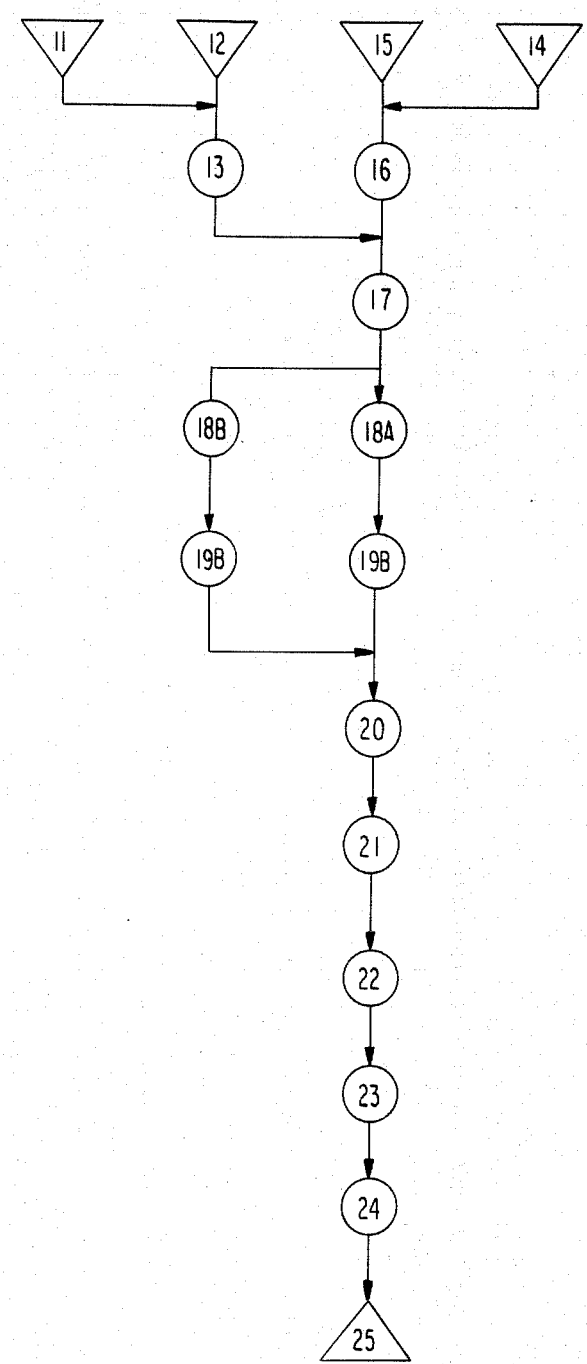
FIG. 2 is a flow sheet for the production of an $Al_2O_3$—$SiO_2$ glass preform containing $R_2O$.

Typical methods for the production of a glass preform according to this invention are represented by the flow sheets of FIGS. 1 and 2. FIG. 1 is a flow sheet for the production of a glass preform containing $R_2O$ ($R_2O=Tl_2O$, $Cs_2O$, $Rb_2O$), wherein 1 is an aqueous solution comprising $R_2O$ and $SiO_2$, such as 500 ml of an aqueous solution of water glass ($SiO_2/R_2O=3.2$, $SiO_2=0.2$ g/ml); 2 is, e.g., one liter of diluting water; 3 is a step of dilution at 5° C.; 4 is a dilute acid, such as 245 ml of 4.0N HCl diluted with 300 ml of water (5° C.); 5 is a step in which the aqueous silicate solution is added to the dilute acid under stirring, with the mixture coming to have a pH of 6.3 and in about 2 minutes turning into a gel; 6A is a step in which the gel left to stand for about 30 to 60 minutes after the step 5 is cut into a predetermined shape (e.g., a 2 cm diameter rod); 6B is an alternative to step 6A in which the liquid mixture of aqueous silicate solution and dilute acid is cast into a vessel of a predetermined shape immediately after the step 5, with the poured mixture turning into a gel in said vessel; 7 is a step of washing the gel with 1N aqueous $NH_4NO_3$ (or 1N aqueous $NH_4Cl$) in a 3-liter Buchner funnel for 2 hours; 8 is a step of drying the gel at 150° C. for 4 hours; 9 is a step of baking the dried gel at 1100° C.; 10 is a final product of an $R_2O$—doped preform (e.g., in a rod form).

FIG. 2 is a flow sheet of the production of another glass preform containing $R_2O$ ($R_2O=Tl_2O$, $Cs_2O$, $Rb_2O$), wherein 11 is an aqueous solution of water glass ($SiO_2/R_2O=2.1$, $SiO_2=0.38$ g/l); 12 is diluting water; 13 is 3 liters of a diluted aqueous solution; 14 is a dilute acid prepared by dissolving 160 g of $Al_2(SO_4)_3.18H_2O$ in 90 ml of conc. $H_2SO_4$; 15 is diluting water; 16 is 3 liters of a diluted acid; 17 is a step wherein 13 is added to 16 with stirring, with the first half of 13 being added slowly and the second half added in one portion to provide a pH of about 4.4; 18A is a step of slightly heating the mixture for a few minutes until it turns into a gel; 18B is a step of casting the mixture obtained in 17 into a vessel of a predetermined shape; steps 19A and 19B are alternatives to steps 18A and 18B, wherein 19A is a step of cutting the gel into a predetermined shape, and 19B is a step of slightly heating the casting for a few minutes; 20 is a step of leaving the resulting gel for three whole days and nights; 21 is a step of leaving the gel in 10 liters of 1% aqueous $NH_4OH$ for one day; 22 is a step of heating the dried gel in 12 to 15 liters of 10% aqueous $NH_4Cl$ at 70° C. for a few hours; 23 is a step of drying the gel at from 120° to 150° C.; 24 is a step of baking the gel at 1000°–1100° C. for from 2 to 6 hours; and 25 is a final product of $R_2O$—doped preform (5.3% $Al_2O_3$—94.7% $SiO_2$ glass base).

This invention is now described in greater detail by reference to the following examples which are given here for illustrative purposes only, and are not intended to limit the scope of the invention. In these Examples, percent is by volume, unless otherwise indicated.

EXAMPLE 1

A 30%–70% mixture of a solution of quaternary ammonium silicate, consisting of 10% $NH_4$–45% $SiO_2$—balance $H_2O$ and a solution of cesium silicate consisting of 12% $Cs_2O$—20% $SiO_2$—balance $H_2O$ was diluted with water 10 fold, and the resulting dilution was mixed with a 3% aqueous solution of $H_2SO_4$ with stirring, and the mixture was poured into a cylindrical Teflon coated vessel 20 mm in diameter and 50 mm high. The vessel was left to stand at room temperature overnight and the casting was taken out of the vessel and leached with 1M $NH_4NO_3$ containing 5 wt% $(NH_4)_2B_4O_7$ at 50° C. for 3 hours. The leached casting was immediately soaked in PrOH at 0° C. and left to stand overnight. Thereafter, the casting was slowly dried under vacuum by reducing the pressure to 1 mmHg over a period of 50 hours and then heated slowly. When the temperature exceeded 100° C., a gas mixture of He (80%) and $O_2$ (20%) was charged into the reactor, and its supply was continued while the casting was heated first to 600° C. over a period of 18 hours, and then to 1100° C. over a period of 5 hours. As a result, a transparent glass rod 10 mm in diameter was produced. The rod was drawn to a diameter of 2 mm and cut and ground into a rod lens whose length was $\frac{1}{4}\times$(pitch). A focusting test was conducted by inserting the lens between two large core diameter fibers (NA=0.15), and the insertion loss was determined by the equation : Loss (dB)=10 log ($P_{in}/P_{out}$) wherein $P_{in}$ is input light energy and $P_{out}$ is output light energy. The insertion loss was found to be less than 2 dB.

EXAMPLE 2

A transparent glass rod 10 mm in size was produced as in Example 1 except that the solution of 1M $NH_4NO_3$ containing $(NH_4)_2B_2O_7$ was replaced by a solution of 1M NH$_4$NO$_3$ containing 30 wt% KNO$_3$ and that the vitrification temperature was 950° C. A rod lens obtained by cutting and grinding the rod to a length of ¼×(pitch) had very good focusing ability.

The process of this invention for producing a rod lens material has the following advantages.

(1) A large-size product of a desired shape can be produced by gelling a mixture of alkali silicate solution with dilute acid in a large vessel;

(2) An in-expensive product can be produced from an economical material through fairly simple steps that are easy to control;

(3) A gel is formed from a uniform mixture of silicate solution and dilute acid, so the phase separation is uniform throughout the gel, and fluctuations in the refractive index is small in every part of the gel;

(4) By controlling the composition of the liquid and temperature conditions around a spherical or cylindrical casting, the concentration of a dopant to provide a high refractive index can be decreased or the concentration of a dopant to provide low refractive index can be increased from the center outward, to thereby provide a product wherein the refractive index is decreased from the center outward following a predetermined curve. In particular, by decreasing the refractive index parabolically from the center outward, a material for self-focusing rod lens can be produced;

(5) By using Tl$_2$O, Cs$_2$O or Rb$_2$O as a high refractive index dopant, B$_2$O$_3$ or F as a low refractive index dopant and Li$_2$O, Na$_2$O or K$_2$O as a medium refractive index dopant, a desired distribution of refractive index can be obtained while minimizing the scattering of refractive index by providing a distribution of dopants in predetermined amounts; and (6) A Nd- or Sm-doped glass preform suitable for use in a laser can be produced from a silicate solution containing a compound of Nd or Sm.

While the invention has been described in detail and with reference to specific embodiments thereof, it will be apparent to one skilled in the art that various changes and modifications can be made therein without departing from the spirit and scope thereof.

What is claimed is:

1. A process for producing an optical glass product having a predetermined distribution of refractive index in the interior of the product, said process comprising the steps of:

(a) mixing together a silica compound with a silicate selected from the group consisting of rubidium silicate, thallium silicate and cesium silicate, and thereby preparing an aqueous silicate solution containing from about 0.1 to about 0.6 mol/liter of Si, as SiO$_2$, said solution comprising silicic acid and at least one element selected from the group consisting of rubidium, thallium and cesium;

(b) mixing the silicate solution with an acidic aqueous solution of dilute acetic acid, dilute H$_2$SO$_4$, H$_3$BO$_3$, H$_3$PO$_4$, Al$_2$(SO$_4$)$_3$ or HCl to produce a reaction mixture having a pH of about 6.3 when HCl is used or a pH of about 4.4 when acetic acid, H$_2$SO$_4$, H$_3$BO$_3$, H$_3$PO$_4$ or Al$_2$(SO$_4$) is used, and allowing the reaction mixture to react for a period of time sufficient for polymerization to produce a completely gelled porous product wherein the silica particles of said product are agglomerated;

(c) leaching the gelled product with a liquid capable of dissolving Rb$_2$O, Cs$_2$O or Tl$_2$O, said liquid being selected from the group consisting of (i) water, (ii) a weakly acidic aqueous solution, (iii) an aqueous solution having an alkali metal salt dissolved therein, and (iv) an aqueous solution of organic matter or (v) a mixture of any two of (i) to (iv), said leaching being continued until the concentration of at least one compound selected from the group consisting of Tl$_2$O, Rb$_2$O and Cs$_2$O parabolically decreases from the center of said gelled product outward; and (d) drying the leached product in a predetermined atmosphere, and further heating the partially leached gelled product at a temperature sufficiently high to eliminate the particulate material but lower than the melting point of the silica, whereby the micropores in the leached product are caused to collapse.

2. A process according to claim 1, wherein the aqueous silicate solution prepared in step (a) contains a member selected from the group consisting of ammonium, lithium, sodium, and potassium.

3. A process according to claim 1, wherein the acidic aqueous solution of step (b) contains a cation capable of being converted to an oxide.

4. A process according to claim 1, wherein prior to drying according to step (d), the product is soaked in an organic solvent.

5. A process according to claim 4, wherein the organic solvent is ethanol or propanol.

6. A process according to claim 1, 2, 3, 4, or 5, wherein in step (b) said mixing comprises pouring a stirred mixture of the silicate solution and the acidic aqueous solution into a cylindrical vessel where it is gelled, wherein the gelled product of step (b) is leached in step (c) until the concentration of said at least one compound begins to decrease from said center outward, and thereafter the leached product is dried and sintered in step (d), to provide a glass rod wherein the concentration of at least one compound selected from Tl$_2$O, Rb$_2$O, and Cs$_2$O decreases parabolically from the center outward.

7. A process according to claim 1, 2, 3, 4, or 5, wherein in step (b) said mixing includes stirring the silicate solution and the acidic aqueous solution and said process includes cylindrically grinding the gelled product of step (b) to form a rod prior to step (c), and wherein in step (c) said leaching is until the concentration of said at least one compound begins to decrease from said center outward, and thereafter the leached product is dried and sintered in step (d), to provide a glass rod wherein the concentration of at least one compound selected from Tl$_2$O, Rb$_2$O, and Cs$_2$O decreases parabolically from the center outward.

8. A process according to claim 1, wherein the acidic aqueous solution in step (b) is 3% aqueous H$_2$SO$_4$.

* * * * *